United States Patent
Granger et al.

(10) Patent No.: US 6,863,327 B2
(45) Date of Patent: Mar. 8, 2005

(54) CLIP FOR ATTACHING A CORNER CLADDING TO A VEHICLE

(75) Inventors: Sean Elliot Granger, Detroit, MI (US); Gary Hawkins, South Lyon, MI (US); Adolfo Enrico Milani, Commerce, MI (US); Mark Risdale, Toronto (CA)

(73) Assignee: Decoma International Inc., Concord (CA)

(*) Notice: Subject to any disclaimer, the term of this patent is extended or adjusted under 35 U.S.C. 154(b) by 0 days.

(21) Appl. No.: 10/380,244

(22) PCT Filed: Sep. 11, 2001

(86) PCT No.: PCT/CA01/01280

§ 371 (c)(1),
(2), (4) Date: Mar. 11, 2003

(87) PCT Pub. No.: WO02/23052

PCT Pub. Date: Mar. 21, 2002

(65) Prior Publication Data

US 2004/0012218 A1 Jan. 22, 2004

Related U.S. Application Data

(60) Provisional application No. 60/232,026, filed on Sep. 12, 2000.

(51) Int. Cl.$^7$ .............................................. B62D 39/00
(52) U.S. Cl. ..................... 296/1.08; 24/297; 411/510
(58) Field of Search ............................ 296/1.08, 191, 296/209, 39.1, 190.08, 190.01; 24/297; 411/508, 509, 510

(56) References Cited

U.S. PATENT DOCUMENTS

| | | | | |
|---|---|---|---|---|
| 3,775,927 A | * | 12/1973 | Meyer ........................ | 411/508 |
| 5,202,172 A | * | 4/1993 | Graf ............................ | 24/297 |
| 5,228,816 A | * | 7/1993 | Boville ........................ | 24/297 |
| 5,229,175 A | * | 7/1993 | Seabolt ....................... | 24/289 |
| 5,375,803 A | * | 12/1994 | Kump ......................... | 24/453 |
| 5,433,498 A | * | 7/1995 | Ishiwata ..................... | 296/39.1 |
| 5,876,084 A | * | 3/1999 | Smith et al. ................ | 296/39.1 |
| 5,906,465 A | * | 5/1999 | Sato et al. .................. | 411/510 |
| 6,095,594 A | * | 8/2000 | Riddle et al. ............... | 296/191 |
| 6,179,359 B1 | * | 1/2001 | Clauson et al. ............. | 296/39.1 |

FOREIGN PATENT DOCUMENTS

| | | |
|---|---|---|
| DE | 31 04 487 A1 | 11/1981 |
| FR | 2 296 549 | 7/1976 |

OTHER PUBLICATIONS

Abstract Japan pub. No. 04059446 pub date: Feb. 26, 1992 Hashimoto Forming Ind Co Ltd Reverse Face Structure of Molding for Automobile.
Abstract Japan pub. No. 60191851 pub date: Sep. 30, 1985 Toyoda Gosei Co Ltd Method of Attaching Protector Molding.
Abstract Japan pub. No. 6016350 pub. date: Aug. 26, 1968 Nissan Motor Co Ltd Mounting Structure of End Rubber.

* cited by examiner

Primary Examiner—Lori L. Coletta
(74) Attorney, Agent, or Firm—Clark Hill PLC

(57) ABSTRACT

A clip (10) mounts a corner cladding panel (14) to a body structure (16). The clip has a body (18) having a tab (20) extending in a longitudinal direction. An attachment fixture (22) extends from the body in a direction orthogonal to the longitudinal direction. The clip (10) is attachable to the body structure in the orthogonal direction and positions the clip (10) to receive the corner cladding panel (14) in the longitudinal direction. The body has a pin (24) extending in the orthogonal direction that maintains an orientation of the clip (10) to receive the cladding in the direction of application. The clip (10) has a ridge (28) positioned to snappingly engage the cladding panel (14) to maintain engagement therebetween.

10 Claims, 2 Drawing Sheets

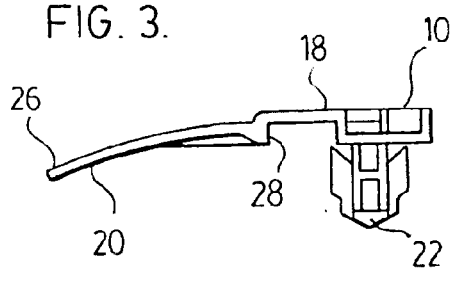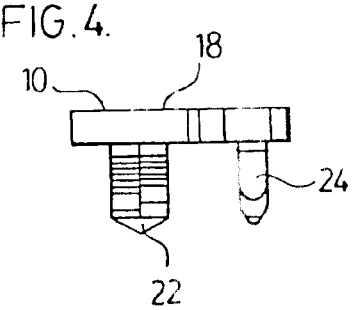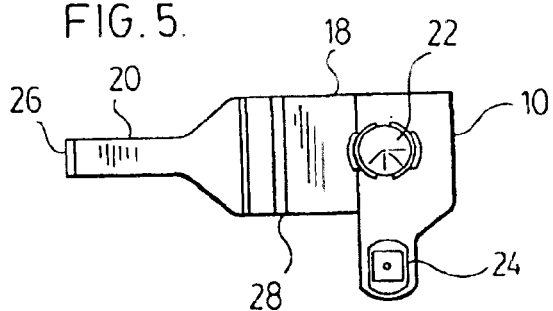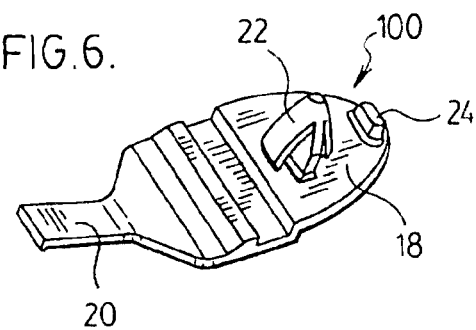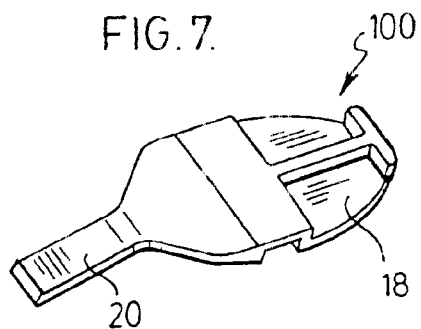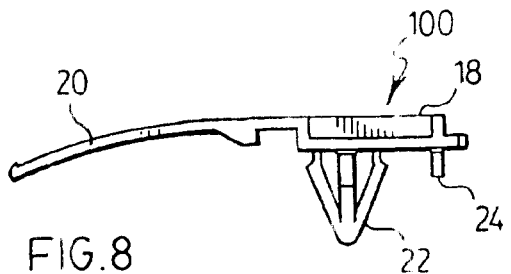

CLIP FOR ATTACHING A CORNER CLADDING TO A VEHICLE

This application is a 371 of PCT/CA01/01280 filed Sep. 11, 2001 which claims benefit of Provisional No. 60/232,026 filed Sep. 12, 2000.

FIELD OF THE INVENTION

This invention relates to a clip for attaching a corner or wrap-around cladding to a vehicle.

BACKGROUND OF THE INVENTION

Cladding or panels are commonly used on vehicles. The panels can be made of plastic material or of sheet metal. The panels are attached to the vehicle structure using a variety of methods. If the panel and the structure are compatible, the panels can be welded to the vehicle. However in many cases, the panel is plastic and the vehicle structure is metal requiring the use of adhesives or fasteners.

Claddings are also applied to corners and are required to wrap-around the corner of the vehicle. Conventional W-clips used to attach plastic claddings, engage the vehicle substrate in the direction of application. When applying a corner piece, the first face can be easily applied but the second orthogonal face becomes very difficult and cumbersome to apply. The second face rotates relative to the first attachment point on the first face and will not be able to move directly perpendicular to the attaching surface for optimum application of conventional W-clips. Thus, corner claddings are normally fastened in a manner which leaves the fasteners visible.

SUMMARY OF THE INVENTION

The disadvantages of the prior art may be overcome by providing a simple clip which allows a corner or wrap-around cladding to be easily and quickly installed.

According to one aspect of the invention, there is provided a clip which mounts a corner cladding panel to a body structure. The clip has a body having a tab extending in a longitudinal direction. An attachment fixture extends from the body in a direction orthogonal to the longitudinal direction. The clip is attachable to the body structure in the orthogonal direction and positions the clip to receive the corner cladding in the longitudinal direction. The body has a pin extending in the orthogonal direction that maintains an orientation of the clip to receive the cladding in the direction of application. The clip has a ridge positioned to snappingly engage the cladding to maintain engagement therebetween.

According to another aspect of the invention, there is provided a method for attaching a corner cladding panel to a vehicle body structure. A cladding panel is provided having a first face and a second face. The second face is generally orthogonal to the first face. The first face has a fastener and the second face having a bridge structure. At least one aperture is provided in each of a first surface of vehicle and a second surface of the vehicle, the first surface being generally orthogonal to the second surface. A clip is attached to the second surface. The clip has a body having a tab extending in a longitudinal direction with the body. An attachment fixture extends from the body in a direction generally orthogonal to the longitudinal direction. The clip is attached by inserting the attachment fixture into the aperture in the second surface so that the longitudinal direction coincides with the direction of application of the panel. The cladding panel is applied to the vehicle by inserting the tab through the bridge structure and moving the cladding panel in the longitudinal direction to engage the fastener to the aperture in the first surface. Preferably, the clip has a detent and the cladding panel is moved in the longitudinal direction until the cladding panel snappingly engages the clip.

DESCRIPTION OF THE DRAWINGS

In drawings which illustrate the embodiments of the present invention,

FIG. 3 is a side elevational view of a clip of the present invention;

FIG. 4 is an end elevational view of a clip of FIG. 3;

FIG. 5 is a plan view of a clip of FIG. 3;

FIG. 6 is a perspective view of a second embodiment of a clip of the present invention;

FIG. 7 is a reverse perspective view of a clip of FIG. 6;

FIG. 8 is a side elevational view of a clip of FIG. 6.

DETAILED DESCRIPTION OF THE INVENTION

Figure 1:
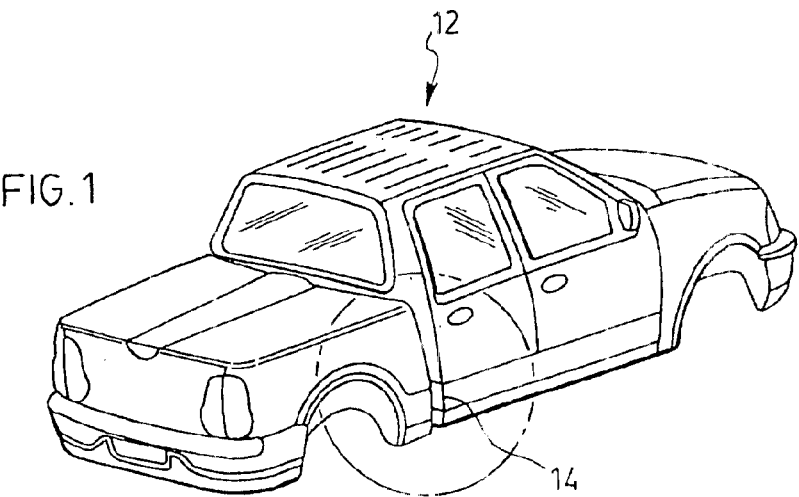
FIG. 1 is a perspective view of a vehicle having a corner or wrap-around cladding attached utilizing the present invention.
Figure 2:
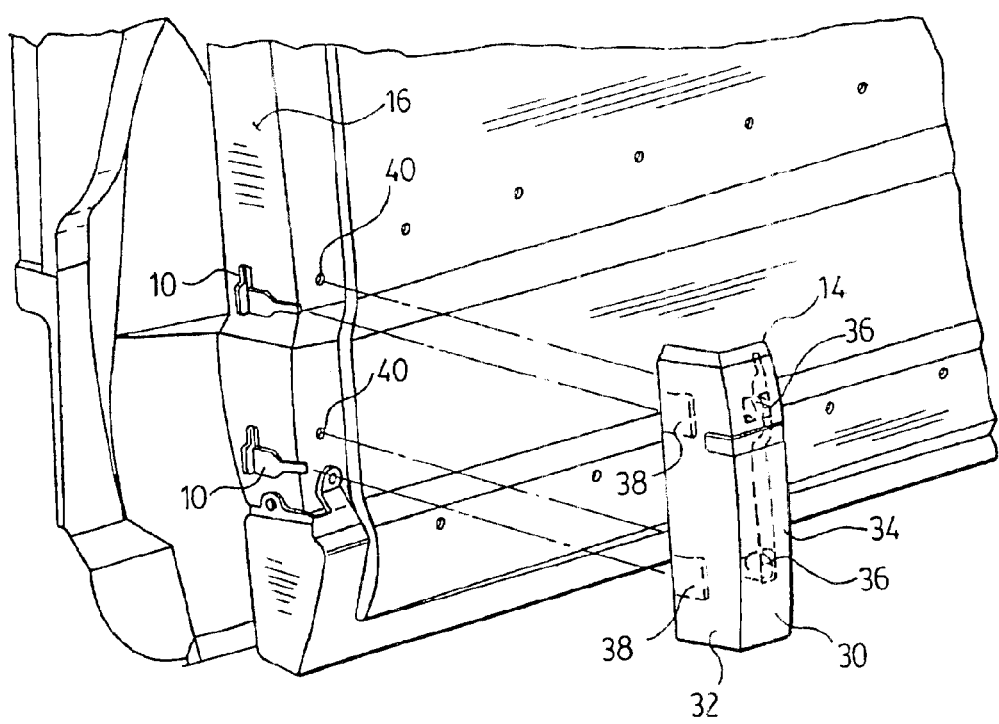
FIG. 2 is an exploded view of a partially assembled vehicle with a corner cladding being attached with a clip of the present invention.

Referring to FIGS. 1 and 2, a vehicle 12 has a corner or wrap-around cladding 14 on the C-pillar 16 of the vehicle 12.

Referring to FIG. 2, the clip 10 of the present invention is mounted on the C-pillar 16 of the vehicle 12 and is positioned to receive and retain the cladding 14.

Referring to FIGS. 3, 4 and 5, the clip 10 generally comprises a flat planar body 18 having a tab 20 extending therefrom, defining a longitudinal direction. Body 18 has an attachment fixture 22 extending generally perpendicular or orthogonal thereto. Attachment fixture 22 is conventional in design, preferably a "Christmas tree" type.

Body 18 also has an anti-rotation pin 24 extending perpendicular thereto. In the preferred embodiment, pin 24 is molded as a separate piece and snapped into a track on the body 18 enabling the pin to slide relative to the attachment fixture 22. Preferably, pin 24 is positioned 90° from the longitudinal direction.

Tab 20 has a rib 26 at a distal end and a ridge or detent 28 at the near end relative to the attachment fixture 22. Preferably, rib 26 and ridge 28 extend from opposite sides of tab 20.

Tab 20 has a thickness which is less than the thickness of body 18. Thus, tab 20 is relatively more flexible than the body. Optionally, body 18 can be provided with a box like construction with reinforcing ribs to improve rigidity thereof Preferably clip 10 is injection molded from a NYLON material.

Referring back to FIG. 2, cladding 14 has a first panel 30 and a second panel 32 which extends generally orthogonal thereto. The inside face of panel 30 is provided with a flange 34 on which conventional fasteners or W-clips 36 are mounted. The inside face of second panel 32 has at least one bridge structures 38 molded thereon. Preferably, bridge structures 38 have a rectangular cross-section defining a slot that receives and guides tab 20 of clip 10.

The vehicle 10 is provided with a series of apertures 40 positioned to receive W-clips 36. On the orthogonal surface of the C-pillar 16, a plurality of pairs of apertures is provided which receive clips 10. The pair of apertures is oriented in the vertical direction of the vehicle. One of the apertures receives the attachment fixture 22 and one, an orienting aperture, receives the anti-rotation pin 24. Preferably, the apertures are different sizes so that the clip 10 can only be installed in one orientation. Once the clip 10 is installed, the tab 20 will extend outwardly of the vehicle 12 in the direction of application of the cladding 14.

To attach the cladding 14, the cladding is presented to the vehicle 12 by aligning the W-clips 36 with the apertures 40 and inserting the tabs 20 into the slots defined by bridges 38. In a single motion in the direction of application, the cladding 14 is pressed against the C-pillar 16 which engages the W-clips 36 in a conventional manner retaining the first panel 30 to the C-pillar and also engages the ridge 28 against a complementary edge of bridge 38. In the preferred embodiment, ridge 28 engages the outer edge of the bridge 38 in a snap fit to firmly retain the second panel 32 to the C-pillar. Tab 20 guides the cladding 14 into position.

Referring to FIGS. 6, 7 and 8, a second embodiment of the clip 100 of the present invention is illustrated. Like components are referenced with the same numerals as the first embodiment. In the second embodiment, clip 100 is integrally molded as a single piece. Anti-rotation pin 24 is aligned with the longitudinal axis of the clip 100.

The invention has been described in an illustrative manner, and it is to be understood that the terminology that has been used is intended to be in the nature of words of description rather than of limitation. Many modifications and variations of the present invention are possible in light of the above teachings. It is, therefore to be understood that within the scope of the appended claims the invention may be practiced otherwise than as specifically described.

We claim:

1. A clip for mounting a cladding panel to a vehicle body structure, said clip comprising:
    a body having a tab extending therefrom defining a longitudinal direction, and having an attachment fixture extending therefrom defining a direction generally orthogonal to the longitudinal direction,
    whereby said attachment fixture is adapted to attach said clip to the body structure in the orthogonal direction and positions the clip for said tab to receive and attach the cladding panel in the longitudinal direction; and
    said body further comprises a pin extending therefrom in the generally orthogonal direction, said pin being attachable to the body structure to maintain an orientation of said clip relative thereto.

2. A clip as claimed in claim 1 wherein said tab further includes a ridge positioned to snappingly engage the cladding panel to maintain engagement therebetween.

3. A clip as claimed in claim 2 wherein said tab is elongate, extending longitudinally between a near end attached to said body adjacent said attachment fixture and a distal end.

4. A clip as claimed in claim 3 wherein said body is configured to be relatively more rigid than said tab.

5. A method of attaching a cladding panel to a vehicle, comprising the steps of:
    providing a cladding panel having a first face and a second face, said second face generally orthogonal to said first face, said first face having a fastener and said second face having a bridge structure;
    providing at least one aperture in a first surface of said vehicle and at least one aperture on a second, surface of the vehicle, said first surface generally orthogonal to said second surface;
    attaching a clip to said second surface, said clip comprising a body having a tab extending in a longitudinal direction with said body, and an attachment fixture extending from the body in a direction generally orthogonal to the longitudinal direction, said clip being attached by inserting said attachment fixture into said aperture in said second surface; and
    applying the cladding panel to the vehicle by inserting the tab through the bridge structure and moving the cladding panel in the longitudinal direction, engaging the fastener to said aperture in said first surface.

6. A method as claimed in claim 5 wherein said clip has a detent and said applying step includes moving said cladding panel in the longitudinal direction until the cladding panel snappingly engages said clip.

7. A method as claimed in claim 6 wherein said second surface is provided with an orienting aperture spaced from said at least one aperture and said clip has a pin; said attaching step including inserting said pin into said orienting aperture, thereby maintaining a predetermined orientation of said clip relative to said vehicle enabling the cladding panel to be attached to the vehicle by movement in a single direction.

8. In combination,
    a corner cladding having a first face and a second face, said second face generally orthogonal to said first face, said second face having a bridge structure,
    a first fastener mounted on said first face, and
    a clip comprising a body having a tab extending in a longitudinal direction, said body having an attachment fixture extending therefrom in a direction generally orthogonal to the longitudinal direction, whereby said clip is attachable to a vehicle body structure in the orthogonal direction and positions the clip to slidably receive the bridge structure of the cladding panel in the longitudinal direction.

9. A combination as claimed in claim 8 wherein said body further comprises a pin extending in the generally orthogonal direction, said pin being attachable to the vehicle body structure to maintain an orientation of said clip relative thereto.

10. A combination as claimed in claim 9 wherein said clip further includes a ridge positioned to snappingly engage said bridge structure to maintain engagement therebetween.

* * * * *